(12) United States Patent
Van Dyke et al.

(10) Patent No.: US 7,987,465 B2
(45) Date of Patent: *Jul. 26, 2011

(54) METHOD AND APPARATUS FOR DYNAMIC ALLOCATION OF PROCESSING RESOURCES

(75) Inventors: Korbin Van Dyke, Sunol, CA (US); Paul W Campbell, Oakland, CA (US); Don A. Van Dyke, Pleasanton, CA (US); Ali Alasti, Los Altos, CA (US); Stephen C. Purcell, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,562

(22) Filed: Jan. 15, 2010

(65) Prior Publication Data

US 2010/0122262 A1    May 13, 2010

Related U.S. Application Data

(63) Continuation of application No. 09/484,549, filed on Jan. 18, 2000, now Pat. No. 7,661,107.

(51) Int. Cl.
*G06F 9/46* (2006.01)
*G06F 15/16* (2006.01)
*G06F 1/20* (2006.01)
*G06F 15/76* (2006.01)

(52) U.S. Cl. ............ 718/104; 718/102; 712/35; 712/36; 345/502; 345/506

(58) Field of Classification Search .................. 718/104
See application file for complete search history.

(56) References Cited

U.S. PATENT DOCUMENTS

| 4,597,041 | A | | 6/1986 | Guyer et al. |
| 5,283,900 | A | | 2/1994 | Frankel et al. |
| 5,303,369 | A | * | 4/1994 | Borcherding et al. ........ 718/104 |
| 5,526,521 | A | | 6/1996 | Fitch et al. |
| 5,706,514 | A | | 1/1998 | Bonola |
| 5,724,587 | A | | 3/1998 | Carmon et al. |
| 5,841,763 | A | | 11/1998 | Leondires et al. |
| 5,913,058 | A | | 6/1999 | Bonola |
| 5,991,808 | A | | 11/1999 | Broder et al. |
| 5,999,990 | A | | 12/1999 | Sharrit et al. |
| 6,078,944 | A | | 6/2000 | Enko et al. |
| 6,098,091 | A | | 8/2000 | Kisor |
| 6,125,394 | A | | 9/2000 | Rabinovich |
| 6,173,306 | B1 | | 1/2001 | Raz et al. |
| 6,289,369 | B1 | | 9/2001 | Sundaresan |
| 6,292,822 | B1 | | 9/2001 | Hardwick |
| 6,301,603 | B1 | | 10/2001 | Maher et al. |
| 6,338,130 | B1 | | 1/2002 | Sinibaldi et al. |
| 6,381,321 | B1 | | 4/2002 | Brown et al. |
| 6,446,129 | B1 | | 9/2002 | DeForest et al. |
| 6,493,776 | B1 | | 12/2002 | Courtright et al. |
| 6,496,922 | B1 | | 12/2002 | Borrill |

(Continued)

*Primary Examiner* — Jennifer N To
(74) *Attorney, Agent, or Firm* — Sterne, Kessler, Goldstein & Fox, P.L.L.C.

(57) ABSTRACT

A method and apparatus for dynamic allocation of processing resources and tasks, including multimedia tasks. Tasks are queued, available processing resources are identified, and the available processing resources are allocated among the tasks. The available processing resources are provided with functional programs corresponding to the tasks. The tasks are performed using the available processing resources to produce resulting data, and the resulting data is passed to an input/output device.

10 Claims, 10 Drawing Sheets

U.S. PATENT DOCUMENTS

| | | |
|---|---|---|
| 6,549,945 B1 | 4/2003 | Sinibaldi et al. |
| 6,658,448 B1 | 12/2003 | Stefaniak et al. |
| 6,665,701 B1 | 12/2003 | Combs et al. |
| 6,938,256 B2 | 8/2005 | Deng et al. |
| 7,196,708 B2 | 3/2007 | Dorojevets et al. |
| 7,376,812 B1 | 5/2008 | Sanghavi et al. |
| 2002/0016811 A1 | 2/2002 | Gall et al. |

* cited by examiner

METHOD AND APPARATUS FOR DYNAMIC ALLOCATION OF PROCESSING RESOURCES

BACKGROUND OF THE INVENTION

1. Field of the Invention

The invention relates generally to computer architectures and more specifically to computer architectures for processing multimedia data.

2. Background Art

Computers traditionally developed around a single central processing unit. As more differ ways of getting information to and from the central processing unit were developed, they were attached to the central processing unit, but the central processing unit remained essentially unchanged.

FIG. 1 is a block diagram illustrating an example of a prior art computer architecture. Traditional data processing systems comprise a general-purpose processor coupled to a variety of application-specific subsystems. Processor 101 is coupled to an application-specific communications subsystem 102, to an application-specific audio subsystem 103, and to an application-specific video subsystem 104.

Such prior art computer architectures suffer from inflexibility in the allocation of resources. For example, when performing processing that does not involve processing of audio data, audio subsystem 103 remains unused. It cannot be used for other purposes since it is permanently configured specifically for processing audio data. Thus, the overall processing capability of the computer architecture is limited by the processing capability of processor 101.

Attempts in the prior art to avoid the inefficiency of the separate application-specific communications subsystem 102, application-specific audio subsystem 103, and application-specific video subsystem 104 have used .a single combined subsystem to perform the functions of subsystems 102, 103, and 104. However, such single combined subsystems still suffer from inflexibility with respect to allocation of resources between the single combined subsystem and processor 101.

Likewise, the processing capability of processor 101 is also limited. For example, a typical modem microprocessor, such as a Pentium III, often executes 200-300 cycle instructions that cannot be interrupted. Also, a typical operating system for such a microprocessor, such as Microsoft Windows, can have high and unpredictable latency with limitations, such as floppy disk accesses that cannot be interrupted.

Therefore, a method and apparatus is needed to provide increased flexibility and efficiency in the allocation of resources in a computer system.

BRIEF DESCRIPTION OF THE DRAWINGS/FIGURES

DETAILED DESCRIPTION OF THE INVENTION

The invention provides a method and apparatus for dynamic allocation processing resources. By using a plurality of processors designed to have low and predictable interrupt latency that is capable of being configured to efficiently support multimedia processing without being encumbered by the Windows operating system while also being capable of being configured to efficiently support the Windows operating system, one embodiment of the invention increases the flexibility and efficiency of allocating system resources.

In accordance with one embodiment of the invention, a single integrated circuit design may be provided to support both general-purpose processing and multimedia processing. This obviates the need to design a separate device for each function to be performed by a computer system. Several instances of the single integrated circuit design may be provided in a system to increase the capability of the system. Processing resources can be efficiently allocated among tasks. Changes to the configuration of the system can be effected by changes in software, without the need for replacement of or addition to hardware.

Figure 1:
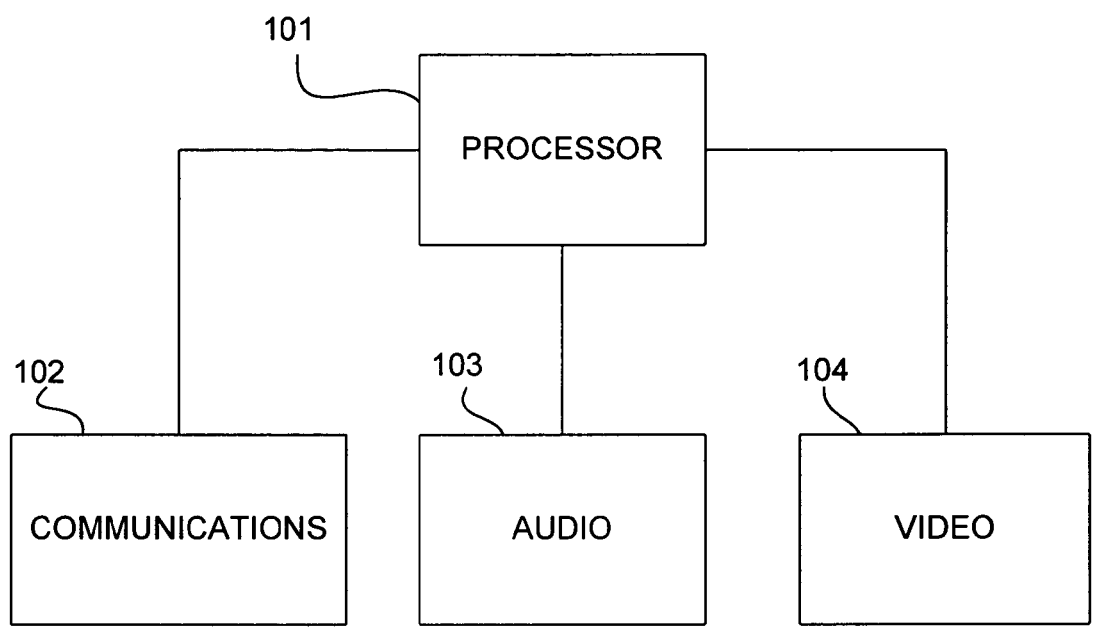
FIG. 1 is a block diagram illustrating an example of a prior art computer architecture.
Figure 2:
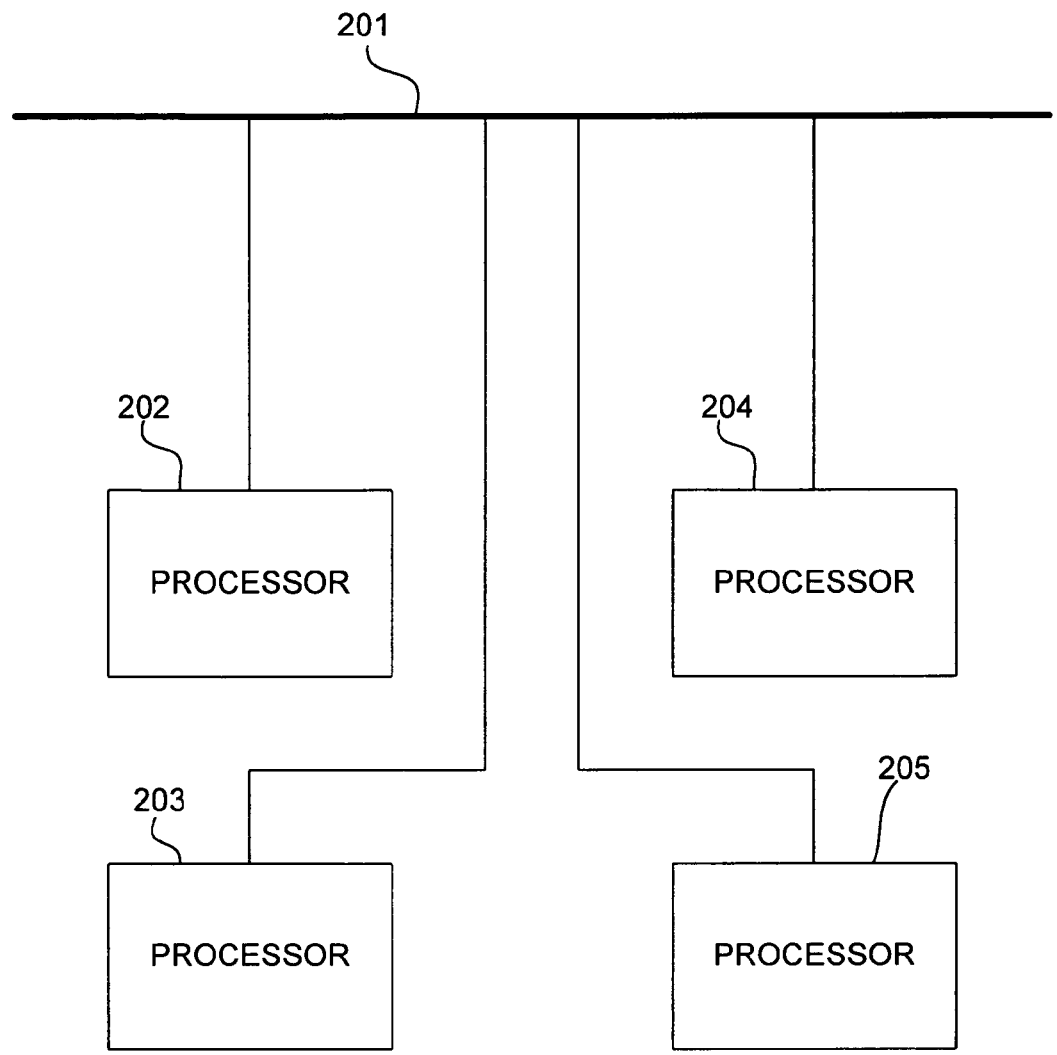
FIG. 2 is a blank diagram illustrating a processing apparatus according to embodiment of the invention.

FIG. 2 is a block diagram illustrating a processing apparatus according to an embodiment of the invention. General-purpose processors 202, 203, 204, and 205 are substantially identical and are coupled to bus 201. Each of processors 202, 203, 204, and 205 may be programmed to function as general-purpose processors or to provide the same functionality as found in an application-specific subsystem. Processors 202, 203, 204, and 205 may communicate with each other and with other components and subsystems via bass 201.

Figure 3:
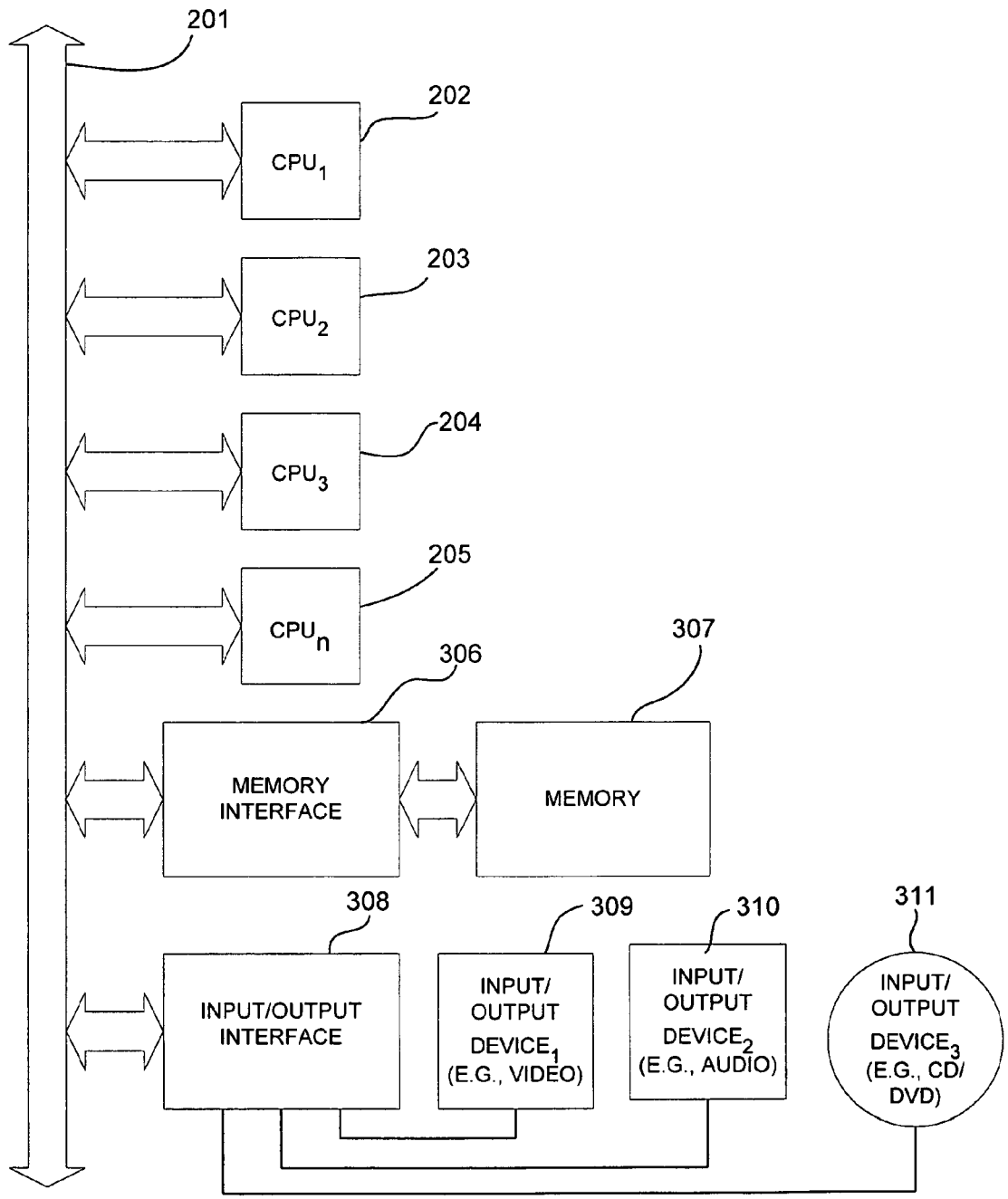
FIG. 3 is a block diagram illustrating a processing apparatus according to an embodiment of the invention.

FIG. 3 is a block diagram illustrating a processing apparatus according to an embodiment of the invention. As described in reference to FIG. 2, processors 202, 203, 204, and 205 are coupled to bus 201. Memory interface 306 is also coupled to bus 201. Memory device 307 is coupled to memory interface 306.

Input/output interface 308 is coupled to bus 201. A first input/output device 309, which might, for example, be a video device, is coupled to input/output interface 308. A second input/output device 310, which might, for example, be an audio device, is coupled to input/output interface 308. A third input/output device 311, winch might, for example, be a CD or DVD disk device, is coupled to input/output interface 308.

Processors 202, 203, 204, and 205 may be provided with a set of instructions in a program to cause them to perform different functions. For example, processor 202 may function as a general-purpose processor, while processor 203 may be provided with instructions to cause it to function as a video processor. As a video processor, processor 203 can communicate with a video device, for example, first input/output device 309 via bus 201 and input/output interface 308.

As another example, processor 204 may be provided with instructions to cause it to function as an audio processor. As an audio processor, processor 204 can communicate with an audio device, for example, second input/output device 310 via bus 201 and input/output interface 308.

Likewise, as another example, processor 205 may be provided with a set of instructions in a program to cause it to function as a CD or DVD processor. As such, processor 205 can communicate with a CD or DVD device, for example, third input/output device 311 via bus 201 and input/output interface 308. U.S. patent application Ser. No. 09/427,168, filed Oct. 26, 1999, entitled Transferring Execution from One Computer Instruction Stream Another, is incorporated herein by reference.

Processors 202, 203, 204, and 205 can perform memory operations on memory device 307 via bus 201 and memory interface 306. While four processors are illustrated, the invention may be practiced with any number of processors.

The system may be initialized by having one of processors 202, 203, 204, or 205 obtain instructions from a known memory location. The instructions determine how the processors should be configured initially. The system may be subsequently reconfigured if desired.

Figure 4:
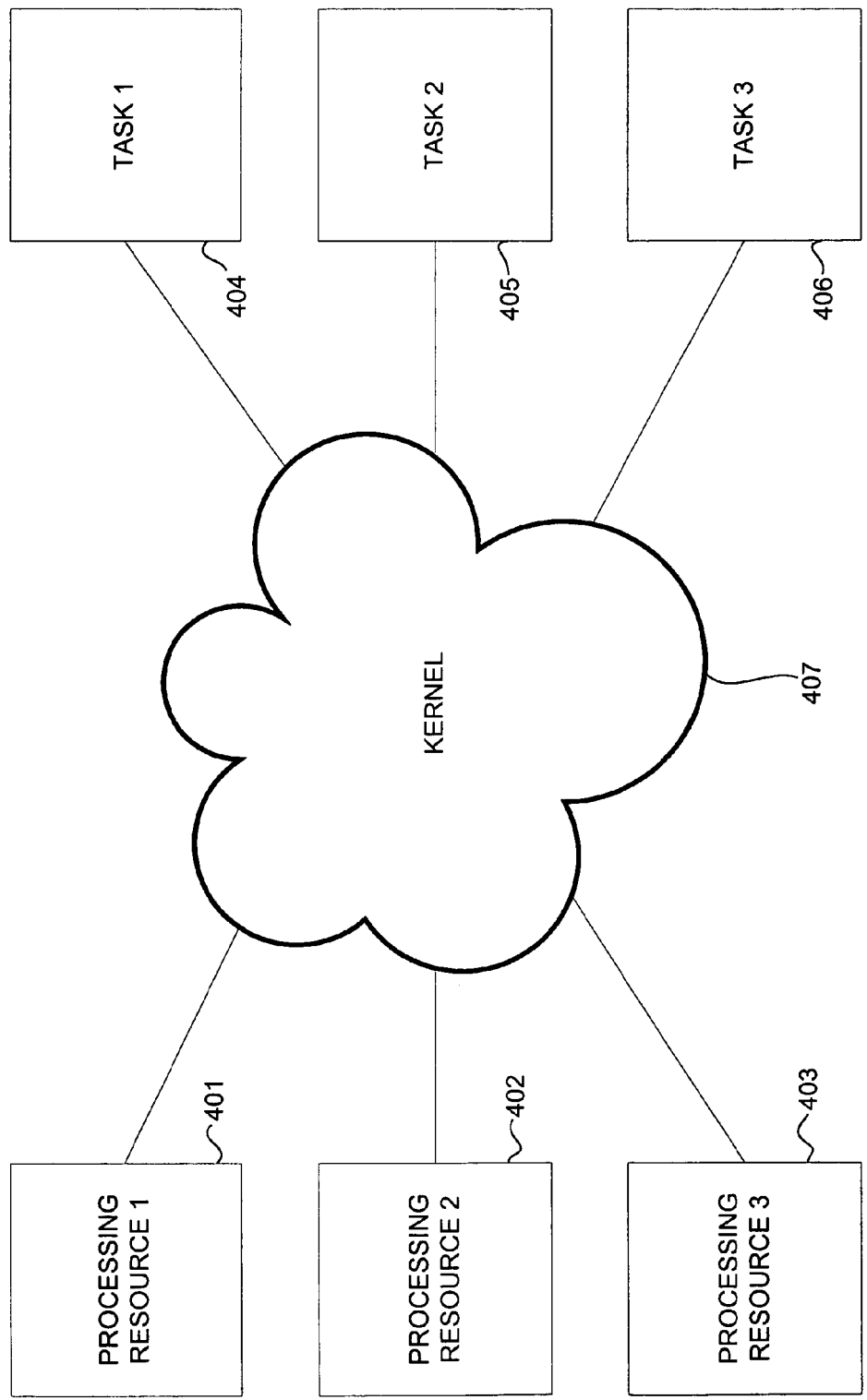
FIG. 4 is a block diagram illustrating kernel functionality according to an embodiment of the invention.

FIG. 4 is a block diagram illustrating kernel functionality according to an embodiment of the invention. A kernel 407 provides the ability to allocate tasks 404, 405, and 406 among processing resources 401, 402, and 403. Tasks 404, 405, and 406 represent any processes or operations which require some amount of processing. Constraints, priorities, and dependencies may exist between tasks 404, 405, and 406. For example, a task may need to be completed by a particular time or before or after another task, and some tasks may be more important than others.

Processing resources 401, 402, and 403 represent capability for processing tasks 404, 405, and 406. This capability may include processors 202, 203, 204, and 205. A portion of processors 202, 203, 204, and 205 may be reserved for other uses and not included within processing resources 401, 402, and 403.

Kernel 407 quantifies the capability of processing resources 401, 402, and 403, quantifies the processing requirements of tasks 404, 405, tend 406 subject to any constraints, priorities, and dependencies that may exist, and dynamically allocates tasks 404, 405, and 406 to processing resources 401, 402, and 403.

Thus, kernel 407 according to one embodiment of the invention can be considered to provide a method for dynamically allocating processing resources for among a plurality of tasks, for example including multimedia tasks, or a method for dynamically allocating a plurality of tasks to a plurality of processors, which may be identical processors.

Kernel 407 may include portions expressed in different instruction sets, for example, a native instruction set and an x86 instruction set. These different instruction sets may include a first instruction in a first instruction set that is denoted by a particular bit pattern and a second instruction set that is denoted by the same particular bit pattern. However, the first instruction in the first instruction set may denote a different operation to be performed than the operation to be performed as denoted by the second instruction of the second instruction set.

Kernel 407 may coordinate different tasks expressed in different instruction sets. For example, task 404 may be expressed in a native instruction set, while task 405 may be expressed in an x86 instruction set. Kernel 407 allows resulting data that results from the performance of one task expressed in one instruction set to be used as initial data in the performance of another task expressed in another instruction set. U.S. patent application Ser. No. 09/239,194, filed Jan. 28, 1999, entitled Executing Programs for a First Computer Architecture on a Computer of a Second Architecture, is incorporated herein by reference.

Figure 5:
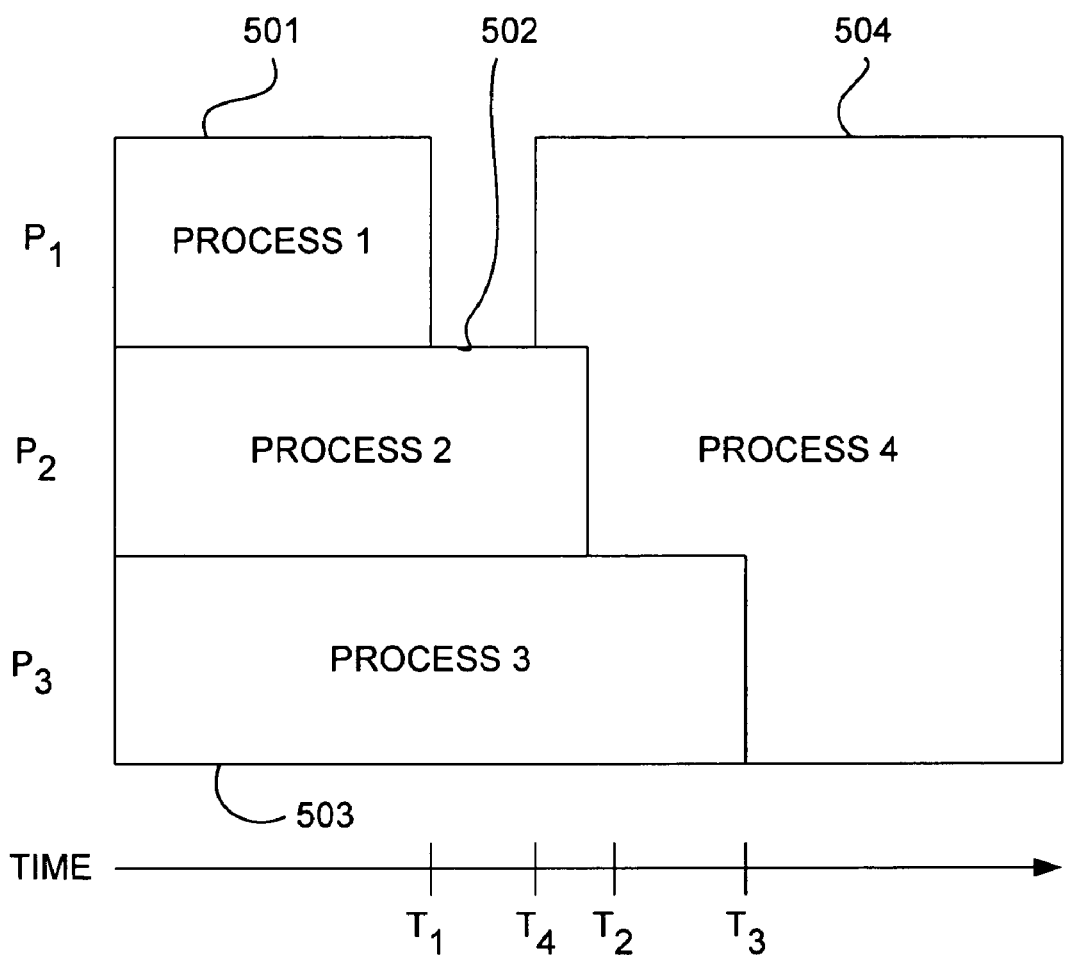
FIG. 5 is a timing diagram illustrating allocation of tasks among processing resources over time according to an embodiment of the invention.

FIG. 5 is a timing diagram illustrating allocation of tasks among processing resources over time according to an embodiment of the invention. The diagram shows how processing resources and tasks may be divided in time and space. For example, a first process 501 is allocated to a first processing resource $P_1$. The first process 501 is completed by the first processing resource $P_1$ at time $T_1$. At the same time, a second process 502 is allocated to a second processing resource $P_2$. The second process 502 is completed by the second processing resource $P_2$ at time $T_2$. At the same time that the first process 501 and the second process 502 are being processed, a third process 503 is being processed by a third processing resource $P_3$. The third process 503 is completed by the third processing resource $P_3$ at time $T_3$.

After time $T_1$, the first processing resource $P_1$ is available to be allocated for other tasks. At time $T_4$, the first processing resource $P_1$ is allocated to begin processing of a fourth process 504. At time $T_2$, the second processing resource $P_2$ becomes available to be allocated for other tasks and is allocated to assist in the processing of the fourth process 504. At time $T_3$, the third processing resource $P_3$ becomes available to be allocated for other tasks and is allocated to assist in the processing of the fourth process 504. At time $T_3$, the third processing resource $P_3$ becomes available to be allocated for other tasks and is allocated to assist in the processing of the fourth process 504. Thus, after time $T_3$, first processing resource $P_1$, second processing resource $P_2$, and third processing resource $P_3$ are all allocated to processing fourth process 504.

The invention may also be used to divide the processing capability of a single processor between multiple tasks. Thus, if two tasks are being performed in a system with three processors, the first processor could be assigned to perform the first task, the second processor could be assigned to perform the second task, and the processing capability of the third processor could be divided to assist the first processor in performing the first task, and the second processor in performing the second task.

Processing resources may obtained by dividing or aggregating the processing capability of one or more processors. For example, the processing capability a single processor may be divided in space or time to provide a processing resource. Dividing the processing capability in space refers to using some amount of the processing capability of a processor to provide one processing resource while simultaneously using other amounts of the processing capability of the processor to provide other processing resources. Dividing the processing capability in time refers to using the processing capability of a processor for some period of time to provide one processing resource and using the processing capability of the processor for a different period of time to provide another processing resource. The periods time may be alternated or cycled between processing resources. Also, division of processing capability in space and time are not mutually exclusive, so processing capabilities may be divided in both space and time to provide processing resources.

Processing resources may obtained by combining the processing capabilities of more than one processor. For example the processing capabilities of two processors may be combined to provide a processing resource. The processing capabilities of multiple processors need not be combined in integer quantities. Rather, the processing capability of a processor may be divided in space or time and combined with the processing capability, or portions thereof, of another processor to obtain processing resources. The ability of processing resources to be obtained by dividing and/or aggregating the processing capabilities of more than one processor allow a portion of a plurality of processors to be used for another purpose and another portion of the plurality of processors to be used for another purpose. The portion of the plurality of processors may include processing capability of the plurality of processors combined and/or divided in space and/or time.

Figure 6:
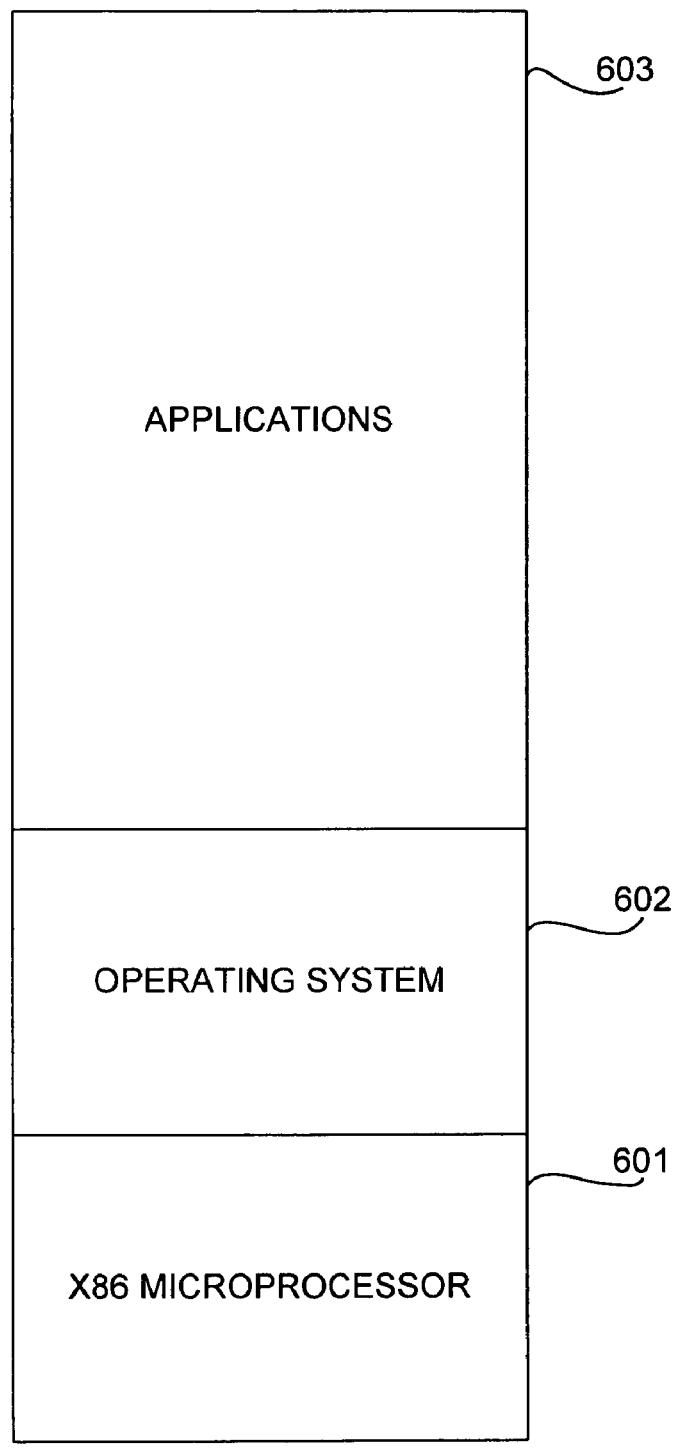
FIG. 6 is a block diagram illustrating layers of processing functionality in a prior art computer system.

FIG. 6 is a block diagram illustrating layers of processing functionality in a prior art computer system. In a traditional computer system, applications 603 arc executed on an operating system 602, which, in turn, is executed on an x86 microprocessor 601. The internal architecture of the x86 microprocessor evolved before the processing of multimedia data and, therefore, does not provide substantial native support for input/output capability as is needed for the processing of multimedia data.

Moreover, the internal architecture of the x86 microprocessor is not optimized for efficient processing of multimedia data. Therefore, additional application-specific circuits are needed in conjunction with the x86 microprocessor. These application-specific circuits cannot be adapted to provide the same functionality as the x86 microprocessor. Thus, the x86 microprocessor and the application-specific circuits are immutably configured to perform their pre-determined roles, their processing capabilities cannot he adjusted or re-allocated.

Figure 7:
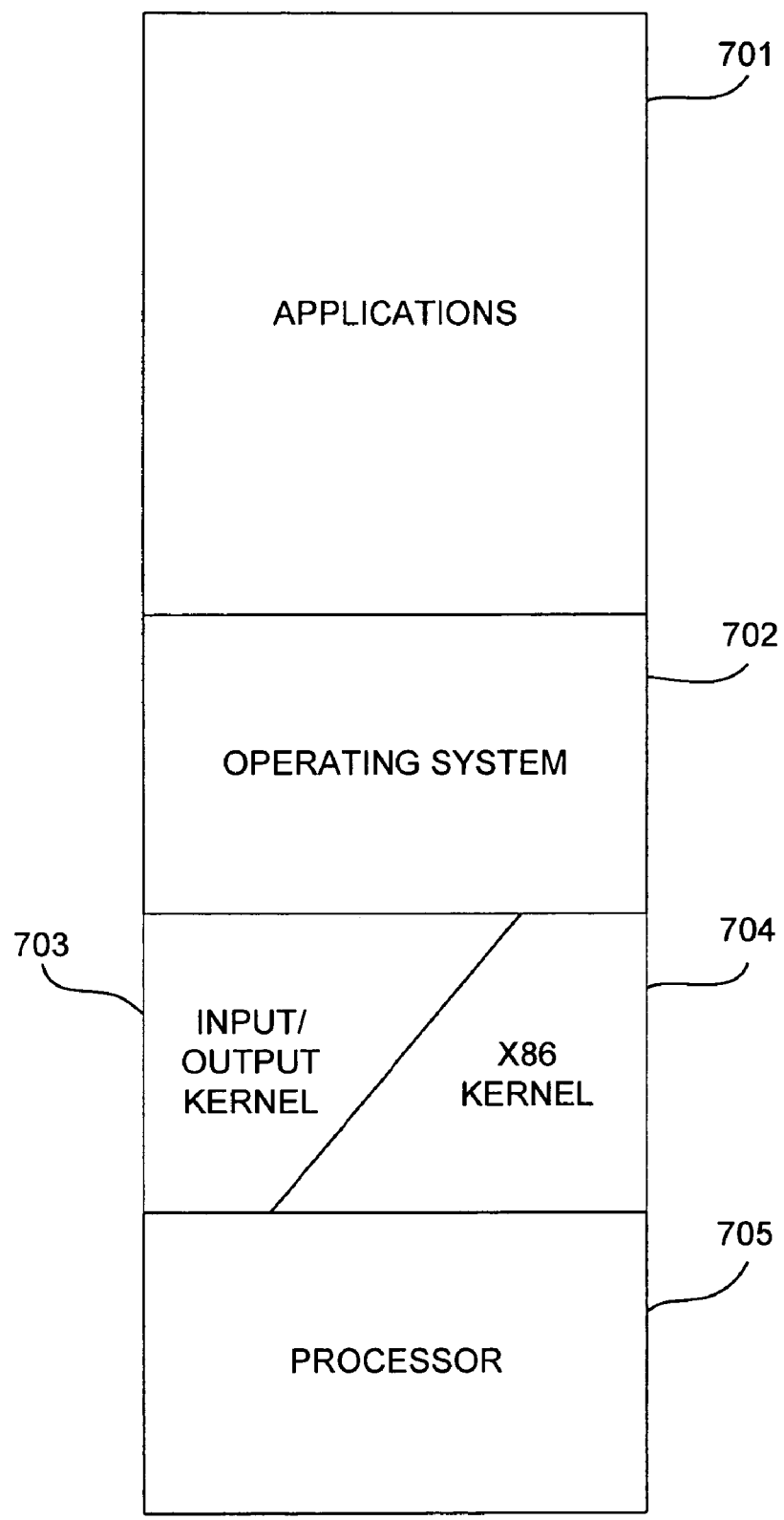
FIG. 7 is a black diagram illustrating layers of processing functionality according to an embodiment of the invention.
Figure 8:
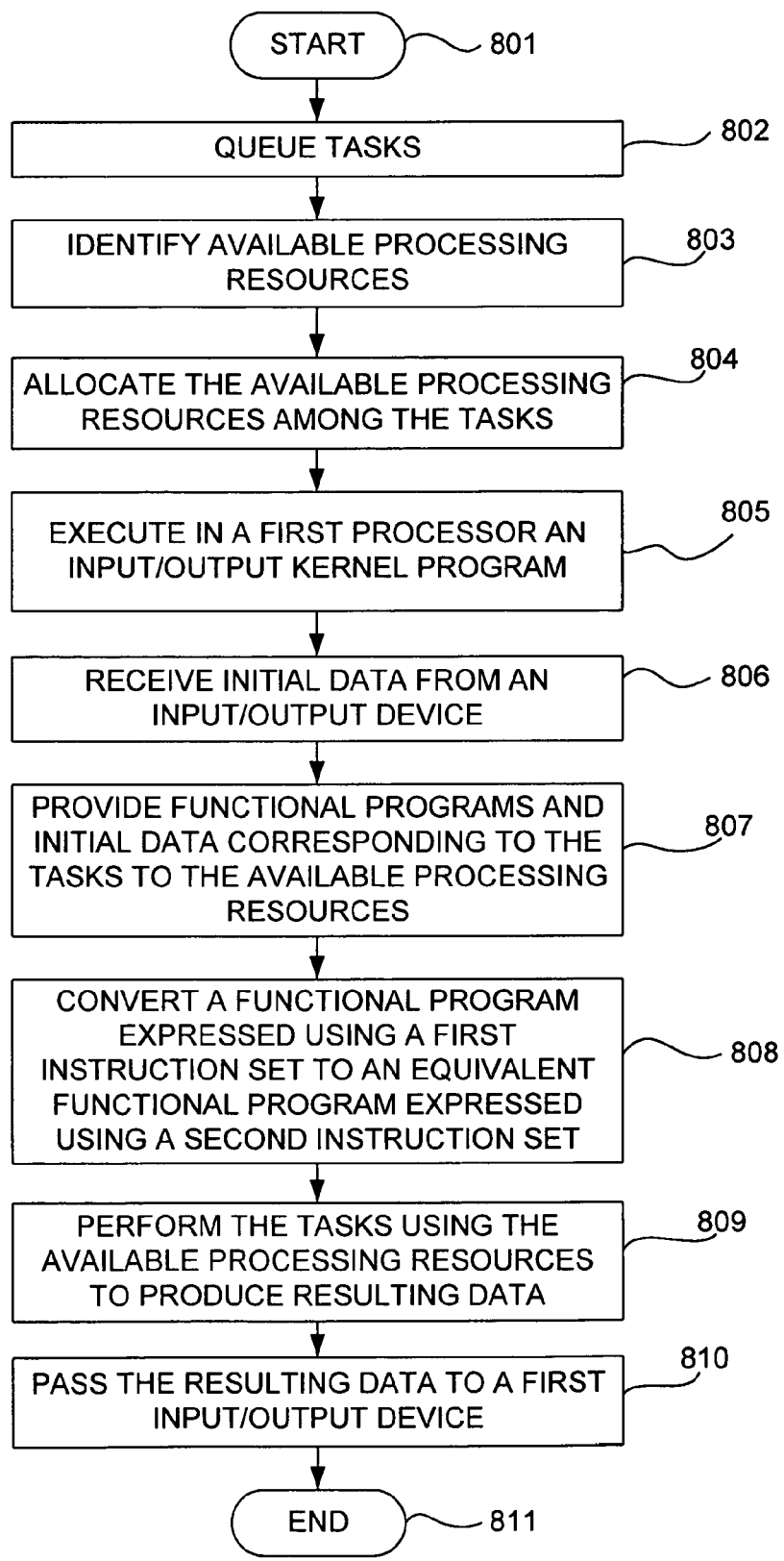
FIG. 8 is a now diagram illustrating a process for providing multimedia functionality in a homogeneous multiprocessor environment according to an embodiment of the invention.

FIG. 7 is a block diagram illustrating layers of processing functionality according to an embodiment of the invention. Either an input/output kernel 703 or an x86 kernel 704 is executed on a processor 705, which need not be an x86 microprocessor. Processor 705 contains structures capable of efficiently supporting operation to provide the functionality of either a microprocessor, such as an x86 microprocessor, or an application-specific circuit, such as circuits for supporting a video, audio, or CD/DVD subsystem. When the x86 kernel 704 is executed on processor 705, the x86 kernel 704 and the processor 705, taken together, support the same instruction set as an x86 microprocessor and may be used in place thereof. Applications 701 are executed on an operating system 702, which is executed on x86 kernel 704 running on processor 705.

When the input/output kernel 703 executed on processor 705, the input/output kernel 703 and the processor 705, taken together, provide the same functionality as application-specific circuits, such as circuits for supporting a video, audio, or CD/DVD subsystem and may used instead of such circuits. Thus, depending on whether input/output kernel 703 or x86 kernel 704 is selected, processor 705 may be dynamically assigned to function in place of a general-purpose microprocessor or application-specific circuits.

The input/output kernel 703 or x86 kernel 704 keeps track of available processing resources and can instruct a processing resource to start executing code at a specific address. The kernels 704 and 704 can also utilize a look-ahead capability to forecast and meet task deadlines associated with particular tasks.

Since x86 kernel 704 operates below operating system 702, x86 kernel 704 can manipulate memory used by operating system 702. For ample x86 kernel 704 can take a portion of memory would otherwise be allocated to operating system 702 and reserve that portion of memory. Likewise, input/output kernel 703 can control or adjust memory allocation.

FIG. Sis a flow diagram illustrating a process for providing multimedia functionality in a homogeneous multiprocessor environment according to an embodiment of the invention. The homogeneous multiprocessor environment comprises a plurality of substantially identical processors. The plurality of a processors are capable executing a first instruction of a first instruction set and a second instruction of a second instruction set. One manner in which the first instruction set may differ from the second instruction set is that the first instruction of the first instruction set and the second instruction of the second instruction set may share an identical bit pattern but perform different operations. The process begins in step 801. In step 802, the process queues tasks. These tasks may comprise various types of processing undertaken by a computer system, such as x86 processing graphic image processing, video processing, audio processing, communication processing, etc. In step 803 the process identifies available processing resources in the homogeneous multiprocessor environment. In step 804, the process allocates the available processing resources among the tasks. This allocation may be dynamically adjusted. In step 805, the process executes a first processor of the plurality of processors an input/output kernel program. The input/output kernel program includes a first portion expressed using the first instruction set and a second portion expressed using the second instruction set. In step 806 the process receives initial data from an input/output device. In step 807, the process provides functional programs and initial data corresponding to the tasks to the available processing resources. In step 808, the process converts e functional program expressed using a first instruction set to an equivalent functional program expressed using a second distraction set. In step 809, the process performs the tasks using the available processing resources to produce resulting data. In step 810, the process passes the resulting data to a first input/output device. This step may further comprise the step of passing the resulting data through an intermediary device, wherein the intermediary device is coupled to the first input/output device and to a second input/output device, which may further comprise the step of automatically adapting to a reallocation of the available processing resources among the tasks. Alternatively, step 810 may further comprise the step of passing the resulting data to a mixed-signal device. The process ends in step 811.

The invention may be practiced using apparatus comprising a plurality of processors coupled to a bus, an input/output interface coupled to the bus, and a plurality of input/output devices coupled to the input/output interface. The plurality of processors process program code configured to perform a plurality of tasks. The program code comprises program code configured to cause a first portion of the plurality of processors to interact with a first input/output device of the plurality of input/output devices. The program code also comprises program code configured to cause a second portion of the plurality of processors to interact with a second input/output device of the plurality of input/output devices. The program code further comprises program code configured to cause a second portion of the plurality of processors to emulate a specific microprocessor instruction set. The apparatus may further comprise kernel program code configured to dynamically allocate the processing of the program code among the plurality of processors.

It can be readily appreciated that the input/output devices may be of a bidirectional nature. For example, processing resources may receive initial data from an input output device, perform tasks to produce resulting data, and .pass the resulting data to the same or a different input/output device.

Figure 10:
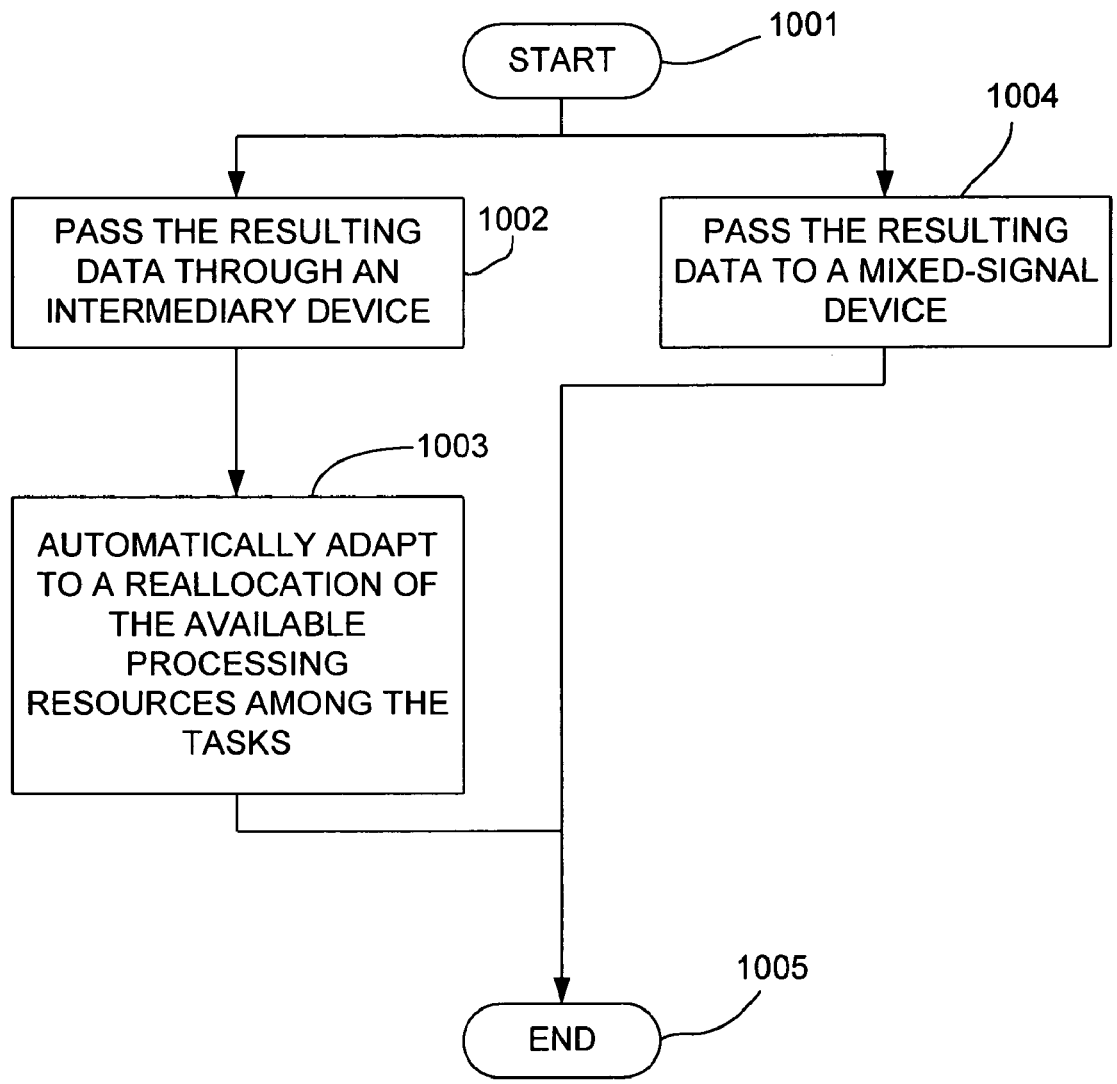
FIG. 10 is a flow diagram illustrating a process for passing resulting data to a first input/output device according to an embodiment of the invention.

FIG. 10 a flow diagram illustrating a process for passing resulting data to a first input/output device according to an embodiment of the invention. In FIG. 10, the process begins in step 1001 and continues in either stop 1002 or step 1004. At step 1002, the process passes the resulting data through an intermediary device. In step 1003, which follows step 1002, the process automatically adapts to a reallocation of the available processing resources among the tasks. In step 1004, the process passes the resulting data to a mixed-signal device. In step 1005, which follows either step 1003 or step 1004, the process ends.

Figure 9:
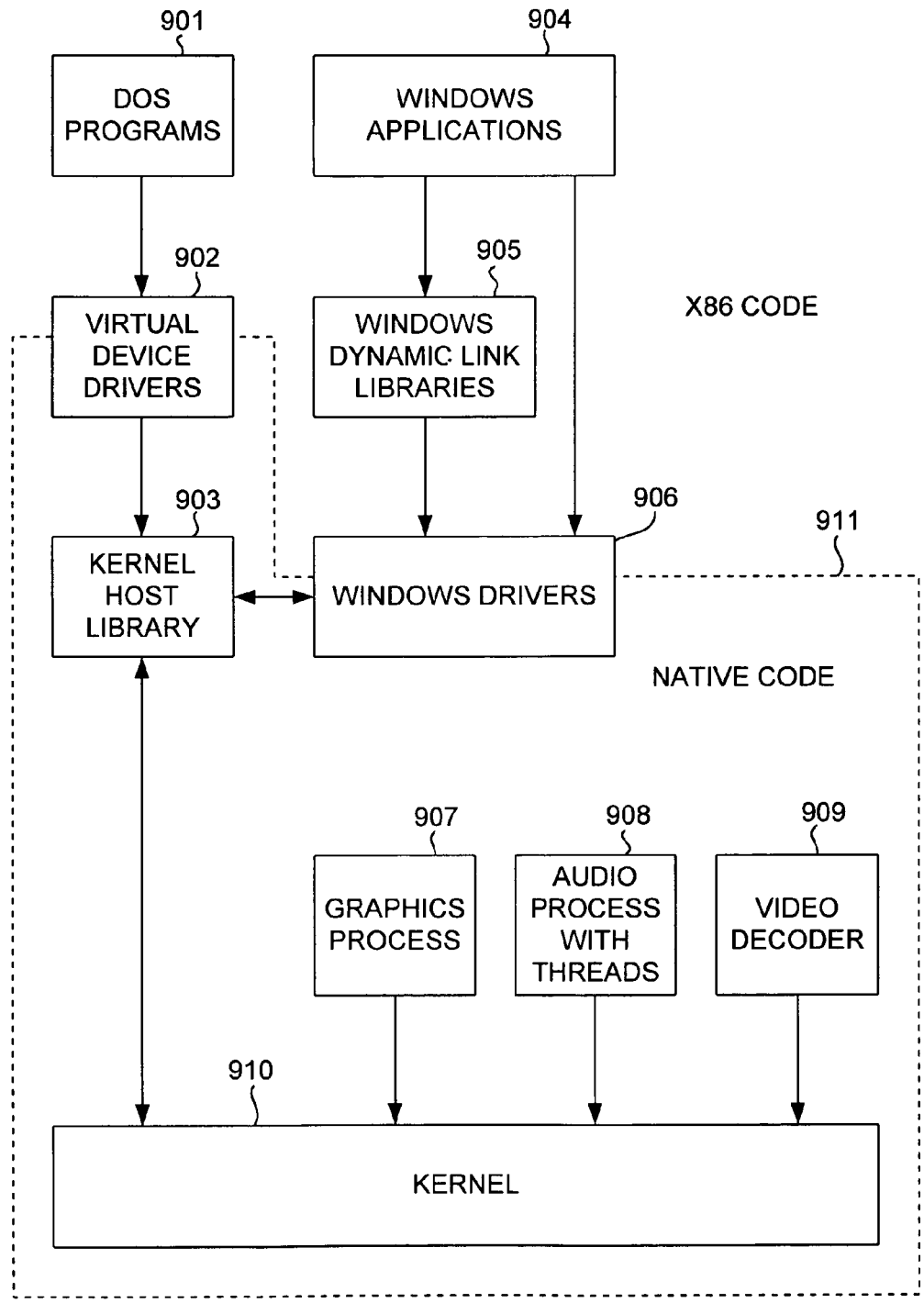
FIG. 9 is a block diagram illustrating a structure capable of supporting software applications and processing multimedia data according to an embodiment of the invention.

FIG. 9 is a block diagram illustrating a structure capable of supporting software applications and processing multimedia data according to an embodiment of the invention. Some software applications, for example disk operating system (DOS) programs 901, are supported by virtual device drivers 902, which are programmed in native code. The virtual device drivers 902 are supported by a kernel host library 903.

Other software applications, for example Windows applications 904 are supported by Windows dynamic link libraries 905, which, in turn, are supported by Windows drivers 906, which are programmed in native code. Alternatively, Windows applications 904 may bypass the Windows dynamic link libraries 905 and be supported directly by Windows drivers 906. Windows drivers 906 are supported by kernel host library 903.

Kernel host library 903 is supported by kernel 910. Kernel 910 also supports graphic process 907, audio process with threads 908, and video decoder 909. Kernel host library 903, kernel 910, graphic process 907, audio process with threads 908, and video decoder 909 are programmed in native code, as denoted by being enclosed within region 911.

Thus, a method and apparatus for dynamic allocation of processing resources has been provided.

What is claimed is:

1. A method for providing multimedia functionality in a homogeneous multiprocessor environment in an integrated circuit including a bus, the method comprising:
   queuing tasks;
   tracking capabilities of available processors in the multiprocessor environment, each of the available processors being coupled to the bus;
   identifying which one of the available processors are available processing resources, the identifying being (i) independent of the queued tasks and (ii) based upon the tracked capabilities;
   allocating the available processing resources among the queued tasks based on a capability of at least one of the available processors to be aggregated with another one of the available processors;
   providing functional programs and initial data corresponding to the queued tasks to the available processing resources; and
   performing the queued tasks using the available processing resources.

2. The method of claim 1, wherein the available processing resources are representative of one or more kernels.

3. The method of claim 1, wherein the queued tasks correspond to two or more instruction sets.

4. A system for providing multimedia functionality comprising:
   a plurality of processors in a homogeneous multiprocessor environment in an integrated circuit including a bus;
   respective memories accessible by each of the plurality of processors; and
   computer programs respectively stored in the memories, the computer programs being configured for:
      queuing tasks;
      tracking capabilities of available processors in the multiprocessor environment, each of the available processors being coupled to the bus;
      identifying which one of the available processors are available processing resources, the identifying being (i) independent of the queued tasks and (ii) based upon the tracked capabilities;
      allocating the available processing resources among the queued tasks based on a capability of at least one of the available processors to be aggregated with another one of the available processors;
      providing functional programs and initial data corresponding to the queued tasks to the available processing resources; and
      performing the queued tasks using the available processing resources.

5. The system of claim 4, wherein the plurality of processors of the homogeneous multiprocessor environment are capable of executing a first instruction of a first instruction set and a second instruction of a second instruction set.

6. The system of claim 5, wherein the first instruction and the second instruction share an identical bit pattern but perform different operations.

7. The system of claim 6, wherein a first processor of the plurality of processors executes an input/output kernel program, the input/output kernel program including a first portion expressed using the first instruction set and a second portion expressed using the second instruction set.

8. The system of claim 7, wherein the computer programs are further configured for:
   converting a functional program of the functional programs expressed using the first instruction set to an equivalent functional program expressed using the second instruction set.

9. The system of claim 8, wherein the queued tasks include at least one from the group including x86 processing, graphic image processing, video processing, audio processing, and communication processing.

10. A non-transitory computer readable media storing instructions wherein said instructions when executed are adapted to process work items on a graphics processing device to perform a method for providing multimedia functionality in a homogeneous multiprocessor environment in an integrated circuit including a bus, the method comprising:
   queuing tasks;
   tracking capabilities of available processors in the multiprocessor environment, each of the available processors being coupled to the bus;
   identifying which one of the available processors are available processing resources, the identifying being (i) independent of the queued tasks and (ii) based upon the tracked capabilities;
   allocating the available processing resources among the queued tasks based on a capability of at least one of the available processors to be aggregated with another one of the available processors;
   providing functional programs and initial data corresponding to the queued tasks to the available processing resources; and
   performing the queued tasks using the available processing resources.

* * * * *